No. 658,692. Patented Sept. 25, 1900.
R. WILLIAMS.
HOSE COUPLING.
(Application filed May 19, 1900.)
(No Model.)
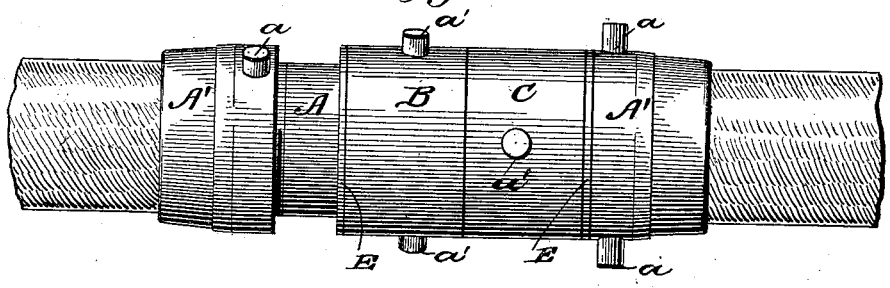
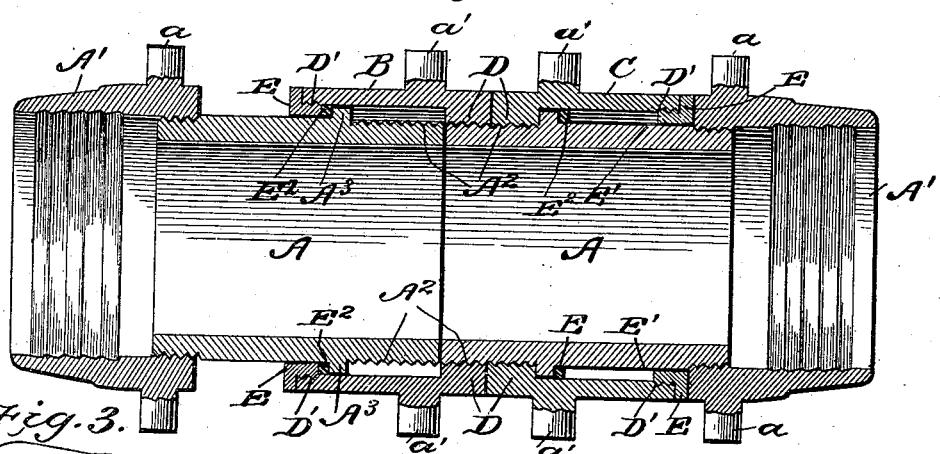
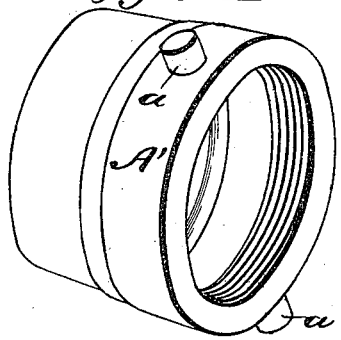
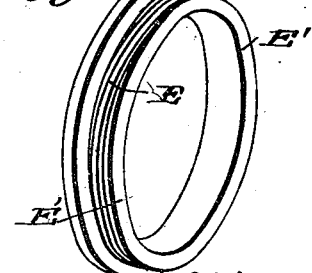
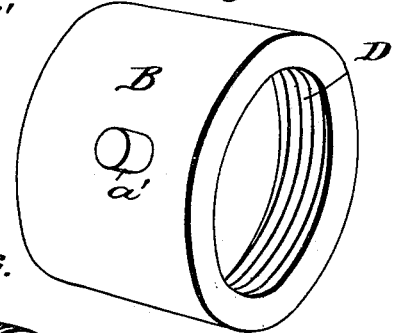
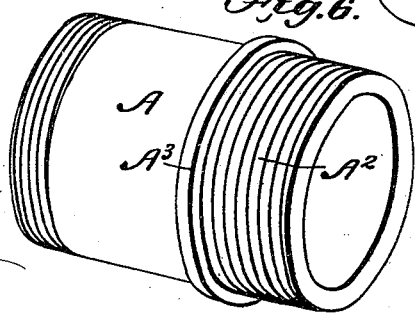
WITNESSES:
M. D. Blondell
F. S. Stitt.
INVENTOR
Rufus Williams.
BY Munn & Co.
ATTORNEYS
THE NORRIS PETERS CO., PHOTO-LITHO., WASHINGTON, D. C.

UNITED STATES PATENT OFFICE.

RUFUS WILLIAMS, OF WALLA WALLA, WASHINGTON.

HOSE-COUPLING.

SPECIFICATION forming part of Letters Patent No. 658,692, dated September 25, 1900.

Application filed May 19, 1900. Serial No. 17,291. (No model.)

*To all whom it may concern:*

Be it known that I, RUFUS WILLIAMS, of Walla Walla, in the county of Walla Walla and State of Washington, have invented a new and useful Improvement in Hose-Couplings, of which the following is a specification.

My invention relates to devices for coupling together sections of hose or pipe; and it has for its object a coupling in which the coupling-collars may be reciprocally used—that is, either capable of screwing on the ferrule of the other abutting section of hose—so that time otherwise lost in selecting the right collar will be gained, which is especially desirable at a fire or on other occasions when quick attachments are the desideratum.

The invention consists in certain details of construction and arrangements and combinations of the parts, which I shall hereinafter fully describe and claim.

Reference is to be had to the accompanying drawings, forming part of this specification, in which like characters of reference indicate corresponding parts in all the views.

Figure 1 is a side elevation of my improved hose-coupling. Fig. 2 is a longitudinal vertical section thereof. Fig. 3 is a perspective view of one of the attaching-nipples shown detached. Fig. 4 is a similar view of a locking-collar. Fig. 5 is a similar view of one of the coupling-collars, and Fig. 6 is a similar view of one of the thimbles or ferrules.

Each section of hose to be coupled is provided with a thimble or ferrule A, having secured on its rear end by screw-thread engagement a nipple or tubular extension $A'$, adapted to be screwed directly on the end of the hose and preferably formed with spanner-studs $a$. The opposite end of the ferrule A is formed with a right-hand thread $A^2$, terminating in an annular flange $A^3$, which is formed with right-angle shoulders, and the body portion of the ferrule is smooth or devoid of threads, as shown, from the flange $A^3$ to the nipple $A'$.

On the ferrules A are adapted to fit coupling-collars B and C, which I have designated by different reference-letters for the purpose of clearness in the subsequent description of the operation of the parts, but which are identical in construction. The interior of each collar is of such a diameter that it will fit over the flange $A^3$, and each collar is provided at its forward end with an inwardly-extending annular flange D, threaded to screw on the threaded end $A^2$ of the ferrule A and adapted to abut against the flange $A^3$ on said ferrule to limit the inward or rearward movement of the collar. The rear end of each collar is also threaded, as indicated at $D'$, and is adapted to have inserted therein the threaded locking-ring E, whose body $E'$ abuts or bears against a gasket $E^2$, lying next to the flange $A^3$, whereby the movement of the collar in an outward or forward direction is limited. Each coupling-collar is of such a width that when it is at the outer limit of its movement, as shown in Fig. 2, it is out of threaded engagement with its ferrule and is held in a swiveled relation to the ferrule by means of the locking-ring E. The collars are provided, preferably, with spanner-studs $a'$.

Now in practical application the sections of hose to be coupled are placed end to end, and one collar—say the collar C—is turned back on its ferrule A until the flange D abuts against the flange $A^3$. The collar B is then turned outwardly on its ferrule and screwed upon the other ferrule until the two adjacent ends of the collars abut, when the sections of hose will be securely coupled together and the collar B will be swiveled, thereby allowing the sections to be readily turned with respect to each other.

It is evident that either of the collars may be used as the position or coupling collar, which, as stated above, is a very advantageous feature, especially in cases where a quick coupling is of prime importance.

Having thus described my invention, what I claim as new, and desire to secure by Letters Patent, is—

1. In a coupling of the character described, the combination of ferrules adapted to be placed end to end and having threaded ends in which the threads extend in the same direction, and coupling-collars working on said threaded ends, each of said collars being adapted to expose the end of the respective ferrule and also to screw on the end of the other ferrule, as set forth.

2. In a coupling of the character described, a ferrule having a threaded end terminating in an annular flange and a body portion devoid of threads on the other side of said flange, a collar adapted to fit over said flange and having an interior flange adapted to screw upon the threaded end of the ferrule, a locking-ring secured to the inner end of said collar and adapted to abut against the flange on the ferrule whereby to limit the outward movement of the collar, and the width of the collar being such that its flange will be out of threaded engagement with the ferrule when the collar is at the outer limit of its movement, whereby to swivel the collar on the ferrule, as set forth.

3. In a coupling of the character described, the combination of the threaded ferrules adapted to be placed end to end and having annular flanges in the rear of their threaded portions, and collars adapted to fit over said flanges and being themselves provided with interior flanges working on the threaded portions of the ferrules and adapted to abut against the flanges of the ferrules to limit the inward movement of the collars, as set forth.

In testimony whereof I have signed my name to this specification in the presence of two subscribing witnesses.

RUFUS WILLIAMS.

Witnesses:
E. J. DAVIS,
W. A. HUNT.